United States Patent
Dai et al.

(10) Patent No.: US 10,062,193 B2
(45) Date of Patent: Aug. 28, 2018

(54) ATTRIBUTE BASED MAP MARKER CLUSTERING

(71) Applicant: ORACLE INTERNATIONAL CORPORATION, Redwood Shores, CA (US)

(72) Inventors: Yi Dai, Winchester, MA (US); Jairam Ramanathan, Waltham, MA (US); Hugh Zhang, Winchester, MA (US); Prashant Singh, Lexington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 108 days.

(21) Appl. No.: 14/302,924

(22) Filed: Jun. 12, 2014

(65) Prior Publication Data
US 2015/0364118 A1 Dec. 17, 2015

(51) Int. Cl.
*G09G 5/00* (2006.01)
*G06T 11/60* (2006.01)
*G06F 3/147* (2006.01)

(52) U.S. Cl.
CPC ............ *G06T 11/60* (2013.01); *G06F 3/147* (2013.01)

(58) Field of Classification Search
None
See application file for complete search history.

(56) References Cited

U.S. PATENT DOCUMENTS

| | | | |
|---|---|---|---|
| 7,697,013 B2 | 4/2010 | Dolph et al. | |
| 2006/0290697 A1* | 12/2006 | Madden | G06T 11/206 345/440 |
| 2007/0268310 A1* | 11/2007 | Dolph | G06T 17/05 345/629 |
| 2008/0232695 A1* | 9/2008 | Noda | G06F 17/30274 382/224 |
| 2009/0033681 A1* | 2/2009 | Dolph | G06T 17/05 345/629 |
| 2009/0100363 A1* | 4/2009 | Pegg | G06F 3/04817 715/765 |
| 2009/0115785 A1* | 5/2009 | Grandhi | G06F 17/30994 345/440 |
| 2011/0221771 A1* | 9/2011 | Cramer | G06Q 30/02 345/633 |
| 2012/0136865 A1* | 5/2012 | Blom | G06F 17/30141 707/739 |
| 2013/0332068 A1 | 12/2013 | Kesar et al. | |
| 2014/0101601 A1 | 4/2014 | Tang | |
| 2014/0365194 A1* | 12/2014 | O'Hagan | G06K 7/10227 703/11 |
| 2015/0116360 A1* | 4/2015 | Jones | G06T 11/60 345/634 |

* cited by examiner

*Primary Examiner* — Aaron M Richer
*Assistant Examiner* — Khoa Vu
(74) *Attorney, Agent, or Firm* — Potomac Law Group, PLLC

(57) ABSTRACT

A system that clusters map markers on a map receives a plurality of map markers, each having an associated location on the map and at least one attribute, and a characteristic corresponding to the attribute. The system location clusters the map markers based on the location within a cluster. The system then groups the clustered map markers based on the associated attribute, where each grouped marker retains the corresponding characteristic. The system then positions the grouped map markers within the corresponding cluster.

20 Claims, 10 Drawing Sheets

ATTRIBUTE BASED MAP MARKER CLUSTERING

FIELD

One embodiment is directed generally to a computer system, and in particular to a computer system that displays map markers.

BACKGROUND INFORMATION

Many software applications use geospatial data to enhance the user experience. Geospatial data is information that is both geographic and spatial pertaining to a location of natural or constructed features, objects, and/or structures. For example, latitude and longitude coordinates are a type of geospatial data. Geospatial data can be used to enhance application functions.

When geospatial data is integrated into a map display, each location point associated with geospatial data is typically represented as a graphical marker, icon, or indicator on a map display, collectively referred to as a "map marker." When large data sets representing many points are mapped, the map markers may overlap. This overlap can occur where two or more points actually have the same location. In addition, overlap can also occur where points have different locations but the map markers representing the points overlap due to the zoom level of the map view. For example, where two points are located in different locations but in close proximity to each other, the map markers for the two points may overlap in a zoomed in view, but appear as distinct, non-overlapping map markers when the map is viewed in a zoomed out view.

SUMMARY

One embodiment is a system that clusters map markers on a map. The system receives a plurality of map markers, each having an associated location on the map and at least one attribute, and a characteristic corresponding to the attribute. The system location clusters the map markers based on the location within a cluster. The system then groups the clustered map markers based on the associated attribute, where each grouped marker retains the corresponding characteristic. The system then positions the grouped map markers within the corresponding cluster.

DETAILED DESCRIPTION

One embodiment is a system that provides map markers, where each map marker represents both a geospatial location on a map as well as an attribute represented by a distinct characteristic of the map marker. When the map is zoomed out so that the map markers may overlap, the system clusters the map markers based on both location and attributes.

Mapping applications are known that cluster map markers when a map is zoomed out. However, in general, for dense data, these applications cluster map markers based only on the location of the map markers on the map. In these known applications, after running a location based clustering algorithm such as grid based clustering, markers located within a map grid are typically represented by a single map marker with a number indicating the number of map markers within that cluster. However, if the map markers had varying distinguishing characteristics to indicate attributes, such as color, image, or size, those varied characteristics would not be represented by clustered map markers in known applications since the map markers would typically be collapsed into a single map marker, having a single characteristic.

In contrast, embodiments of the present invention cluster map markers based on marker attributes in addition to location density, thus retaining relevant characteristics of the map markers. One or more attributes are selected for clustering in addition to a location based clustering technique. The additional level of clustering by common attributes allows the clustered map markers to retain the defining characteristics of the map markers that make up its group after clustering. For example, a dense data location may include map markers representing 30 homes for sale, and each map marker may have a characteristic of one of three different colors depending on where it falls in three price ranges (i.e., the attributes). One embodiment will first cluster by location, but instead of one marker showing only the cluster location with a number indicating the number of markers and having a single characteristic, as would be done with known approaches, embodiments further split that cluster by price range. The result is three different markers colored by price range and an indication of the number of markers for each price range.

Figure 1:
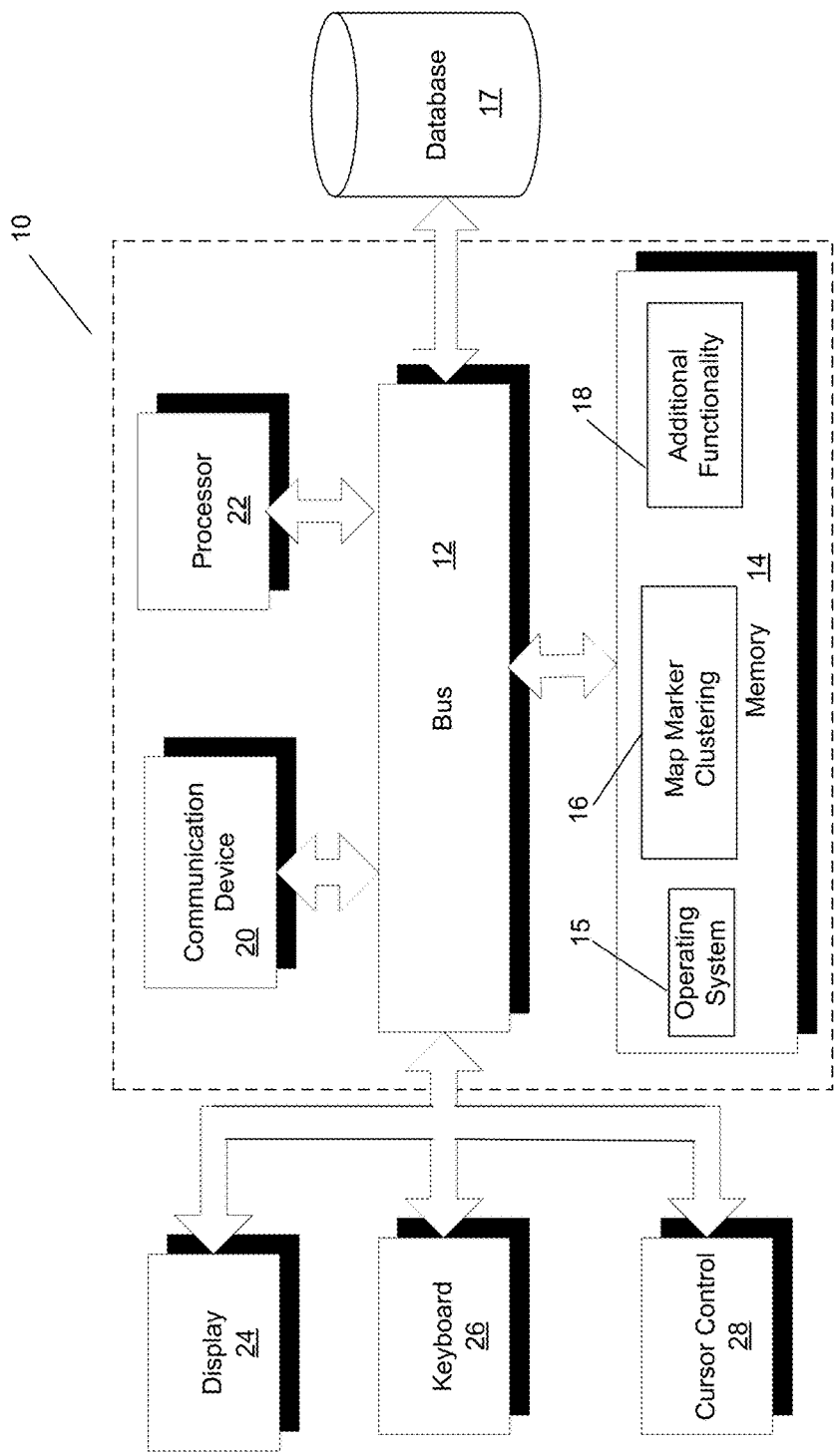
FIG. 1 is a block diagram of a computer system that can implement an embodiment of the present invention.

FIG. 1 is a block diagram of a computer system 10 that can implement an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user, such as a map with map markers. Display 24 can be a touchscreen that allows the user to interact with maps and map markers using touchscreen gestures, including multi-touch gestures. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a map marker clustering module 16 that performs attribute based map marker clustering, as disclosed herein. System 10 can be part of a larger system, such as a mapping system or a geographic information system. Therefore, system 10 will typically include one or more additional functional modules 18 to include the additional functionality. A database 17 is coupled to bus 12 to provide centralized storage for modules 16 and 18 and store mapping information, attributes, etc.

Figure 2:
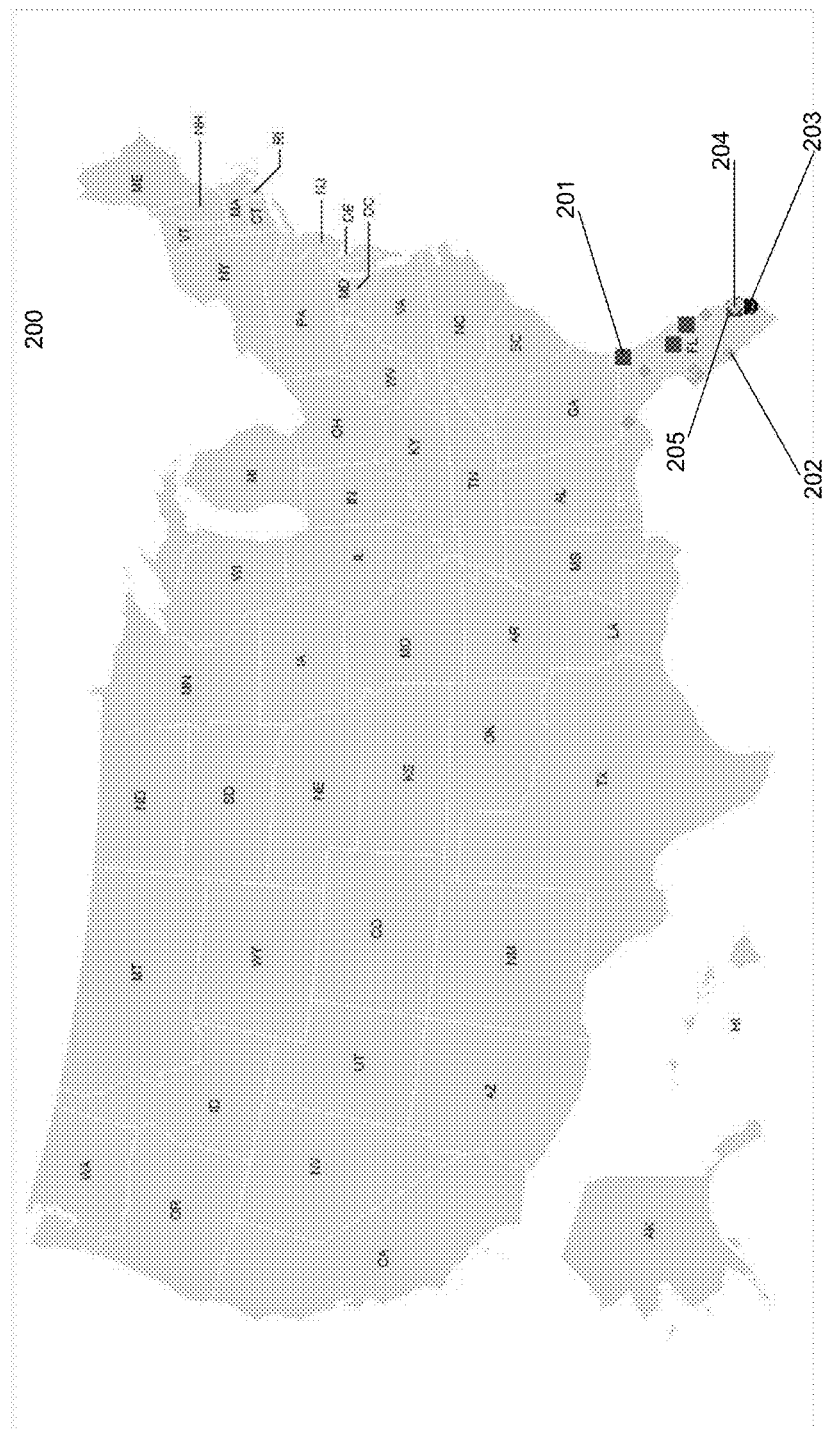
FIG. 2 illustrates a zoomed out view of a United States map in accordance with one embodiment of the invention.

FIG. 2 illustrates a zoomed out United States map 200 in accordance with one embodiment of the invention. Map 200 includes three different map marker characteristic types: a square (e.g., square 201), a diamond (e.g., diamond 202), and a circle (e.g., circle 203). Each different map marker characteristic type provides an indication of a different attribute/dimension of the underlying data. For example, each map marker in FIG. 2 may indicate the location of a car dealership, and the square markers may indicate a Ford dealership, the diamond markers may indicate a Toyota dealership, and the circle markers may indicate a Tesla dealership. Although in FIG. 2, different shapes are used to indicate different attributes, other characteristics can be used such as different colors, different sizes, etc. Further, the position of each map marker on map 200 corresponds to a geographic location on that map.

As shown in FIG. 2, some map markers overlap when zoomed out (e.g., markers 203, 204, 205), making it difficult to distinguish the characteristics and location of some of the markers at this level. As described above, most known mapping applications that support marker clustering will resolve the overlap issue by collapsing close together markers with a single group marker using some type of marker clustering algorithm. An example clustering algorithm is grid-based clustering where the map is divided into squares of equal size and the markers are grouped with the same grid squares. More complicated clustering algorithms may use distance as a factor in determining grouping. However, regardless of the clustering algorithm, the result of these known applications will be a single group marker indicating the group size in the approximate location of the grouped marker locations. When the zoom level changes, marker groups are then recalculated.

Figure 3:
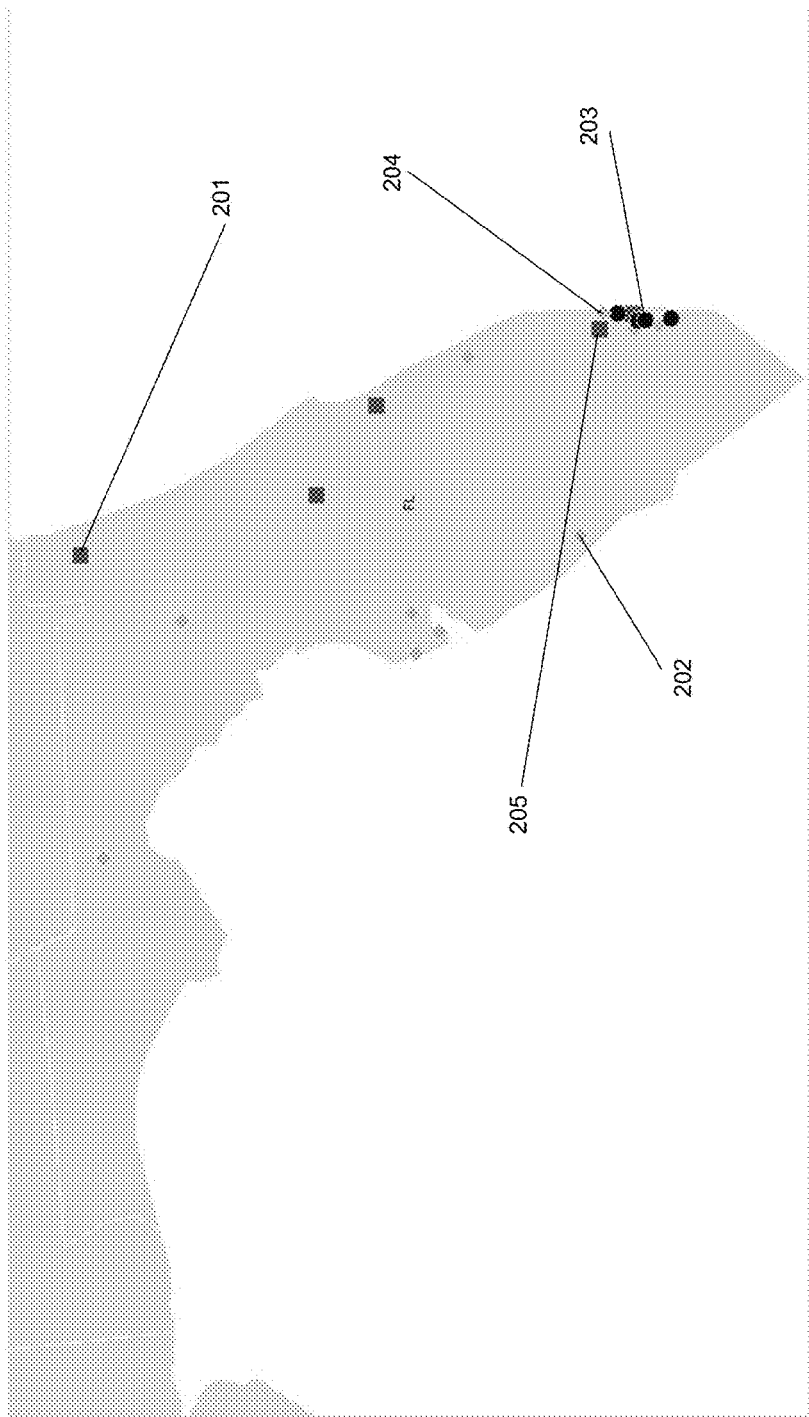
FIG. 3 illustrates a zoomed in view of Florida in accordance with one embodiment of the invention.

FIG. 3 illustrates a zoomed in view of the Florida of FIG. 2 in accordance with one embodiment of the invention. The zoomed in view of FIG. 3 illustrates the individual markers of FIG. 2 more clearly, and reduces the overlap as compared to FIG. 2.

Figure 4:
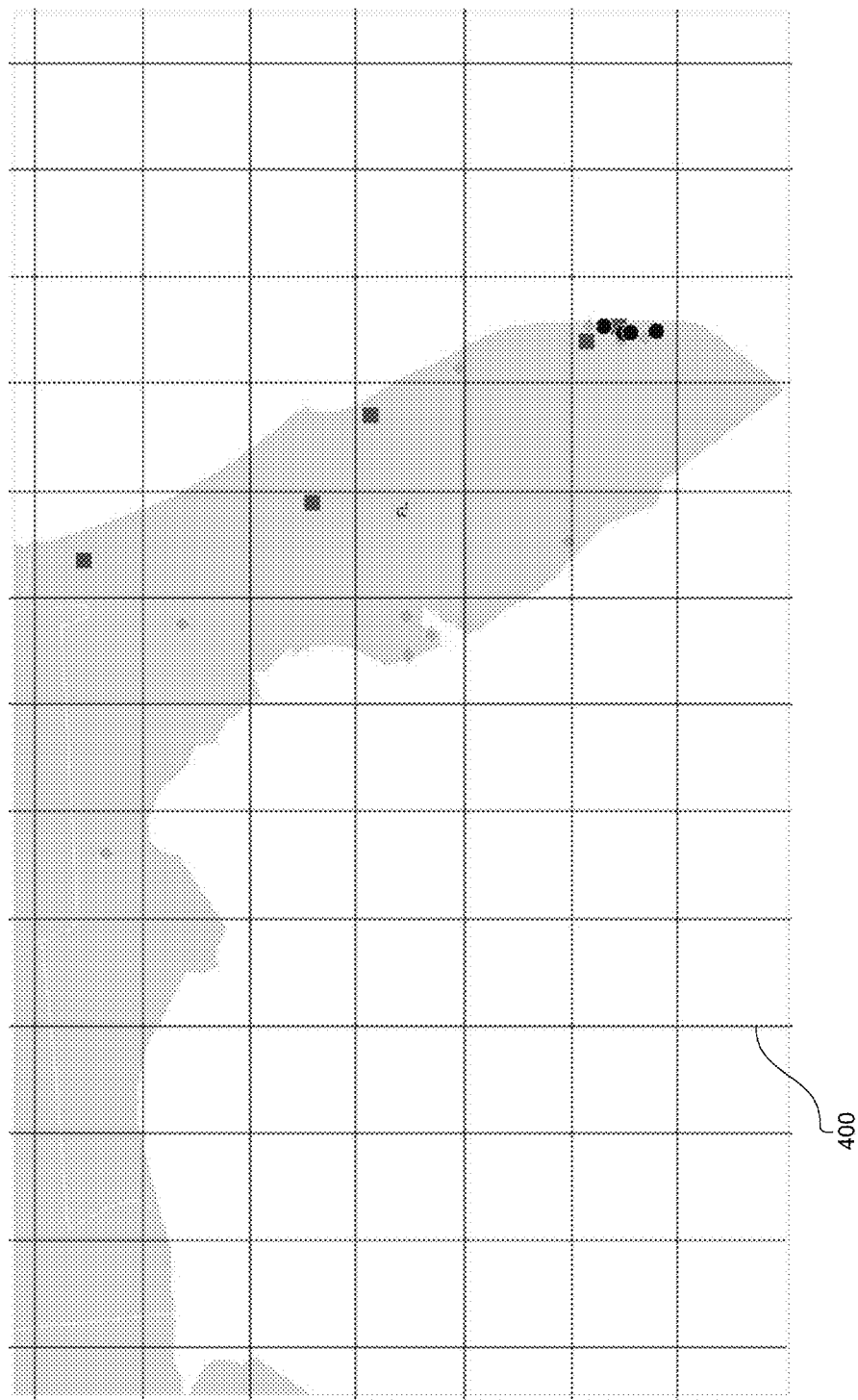
FIG. 4 illustrates the zoomed in view of Florida with a grid overlay in accordance with one embodiment.

FIG. 4 illustrates the zoomed in view of Florida with a grid overlay 400 in accordance with one embodiment. Embodiments first determine which markers will need to be grouped based on location. To determine the grouping, any known clustering algorithm can be used. In the embodiment shown in FIG. 4, a grid-based clustering algorithm is used, as indicated by grid overlay 400.

Figure 5:
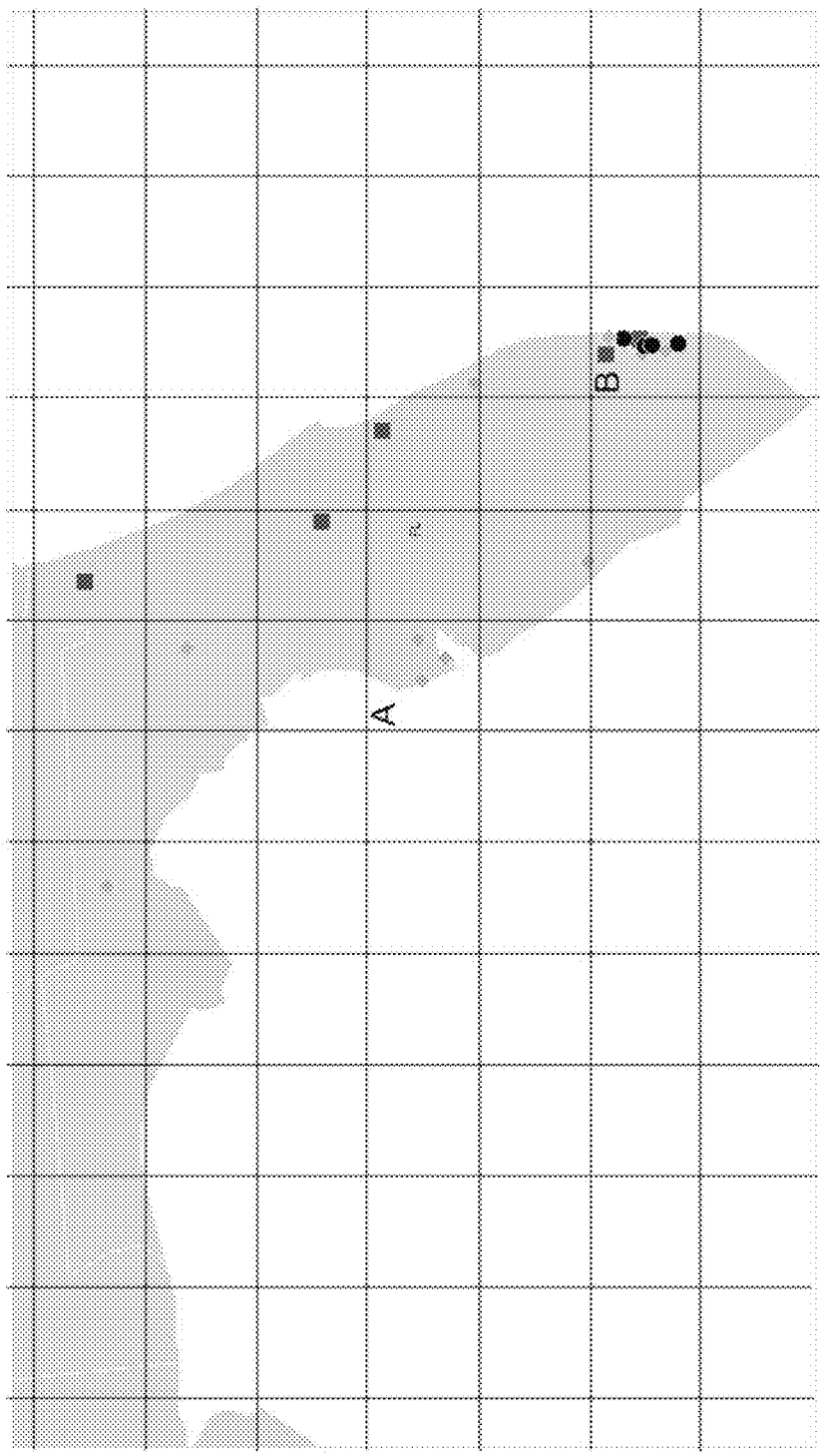
FIG. 5 illustrates the zoomed in view of Florida with the grid overlay in accordance with one embodiment.

FIG. 5 illustrates the zoomed in view of Florida with the grid overlay in accordance with one embodiment. In the embodiment of FIG. 5, using the grid-based clustering algorithm, grids A and B contain markers that would be clustered together because those grids include more than one marker at the same grid location. For any grid that includes more than one marker, those markers would be the subject of clustering. The center of each grid is considered the cluster center. Once the markers that need to be grouped in marker clusters are determined based on location, embodiments then determine the attribute clusters based on characteristics. In the example described, the shape of the marker is the characteristic that is relevant and is to be retained after clustering. Grid A includes only diamond markers, which is one attribute cluster, and grid B includes square, circular, and diamond markers which results in three attribute clusters.

Figure 6:
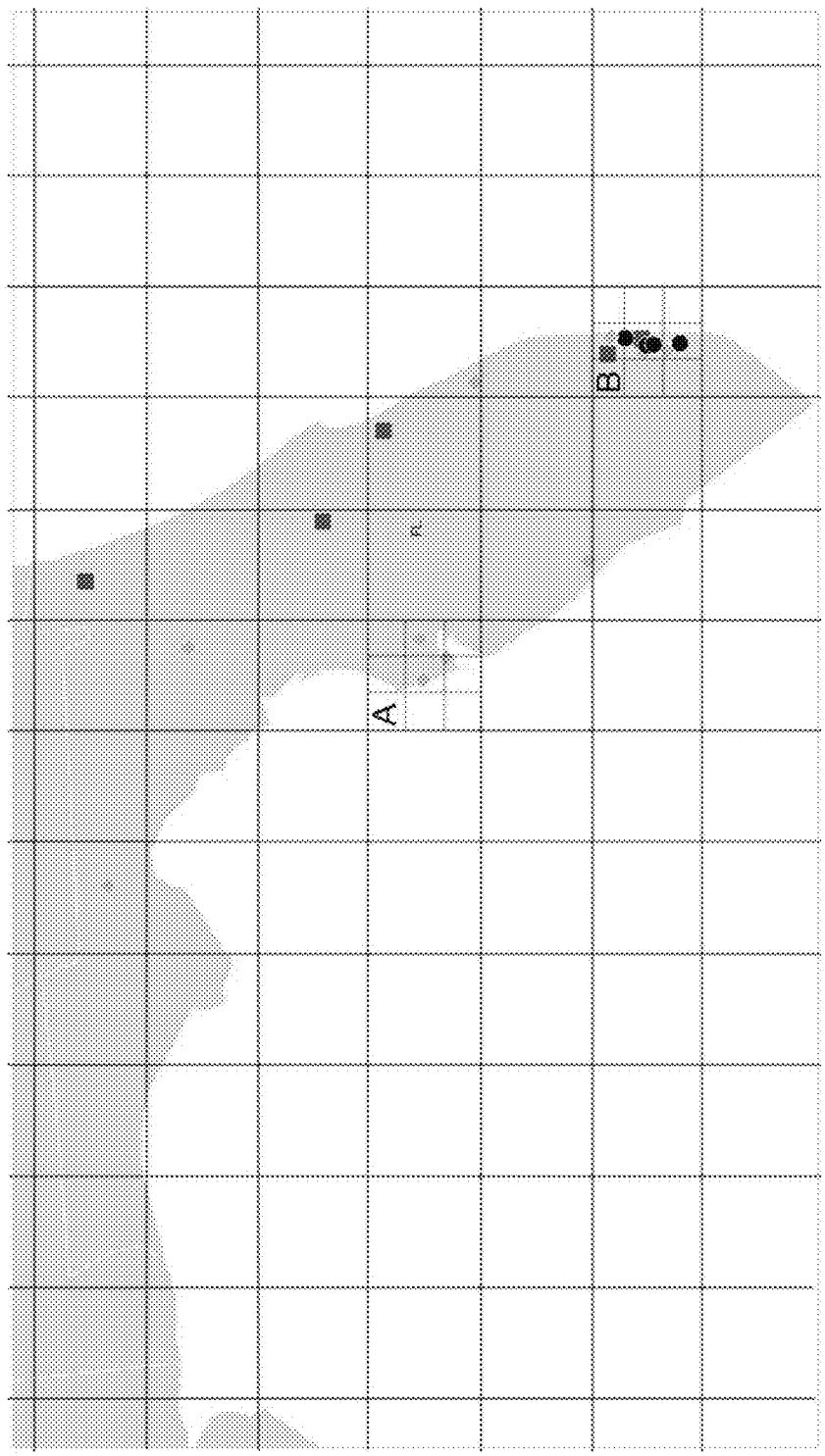
FIG. 6 illustrates the zoomed in view of Florida with the grid overlay and cluster center in accordance with one embodiment.

FIG. 6 illustrates the zoomed in view of Florida with the grid overlay and cluster center in accordance with one embodiment. Embodiments layout the attribute clusters around the cluster center, which in this example is the grid center. Any known layout algorithm can be used, including force-directed, grid, circular, etc. In the example of FIG. 6, a grid layout algorithm is used and grids A and B are divided into equal sized squares.

Figure 7:
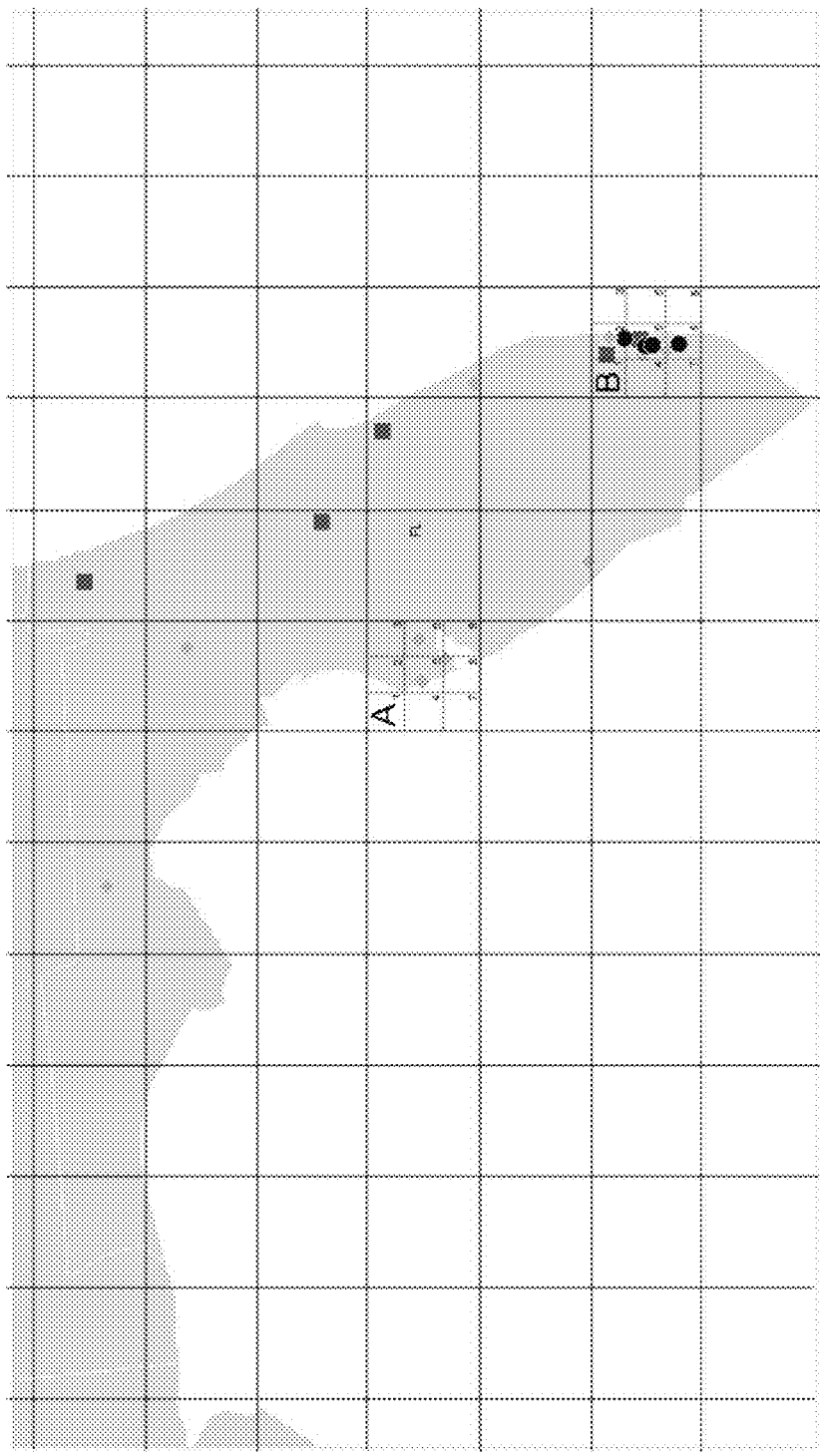
FIG. 7 illustrates the zoomed in view of Florida showing numbered layout grids in grids A and B in accordance with one embodiment.

FIG. 7 illustrates the zoomed in view of Florida showing numbered layout grids in grids A and B in accordance with one embodiment.

Figure 8:
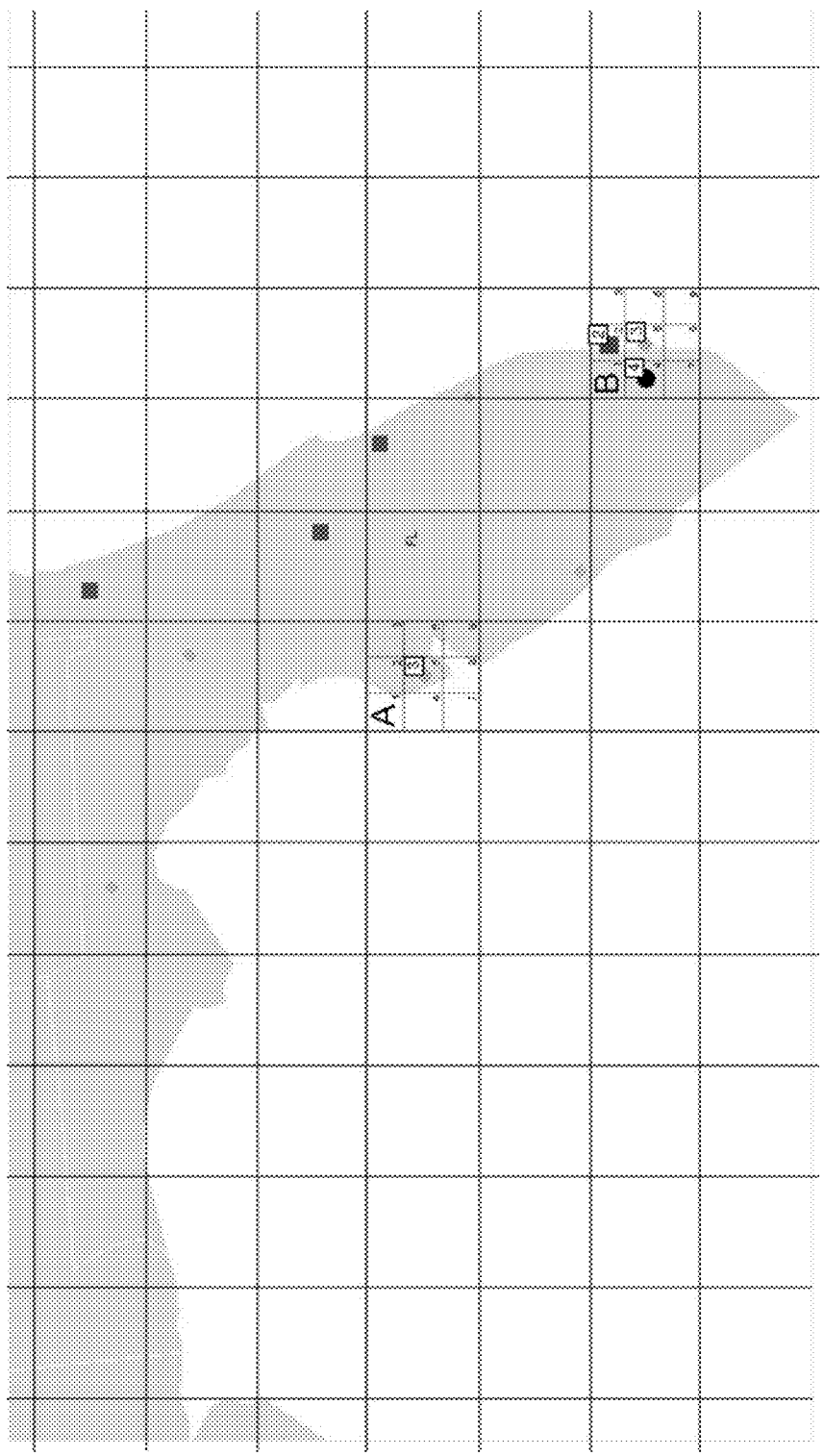
FIG. 8 illustrates the zoomed in view of Florida and the laying out of markers based on attributes in accordance with one embodiment.

FIG. 8 illustrates the zoomed in view of Florida and the laying out of markers based on attributes in accordance with one embodiment. One embodiment starts at the center of the grid and then layouts attribute grouped markers around the center grid. The result is a single marker group in grid A at the center square 5. The marker group has the appearance/characteristic of its grouping attribute (i.e., shape) and indicates the number of markers within its group. In grid B, one attribute group is placed starting at center square 5 and then the remaining groups are placed in the surrounding squares (i.e., squares 4 and 2).

Figure 9:
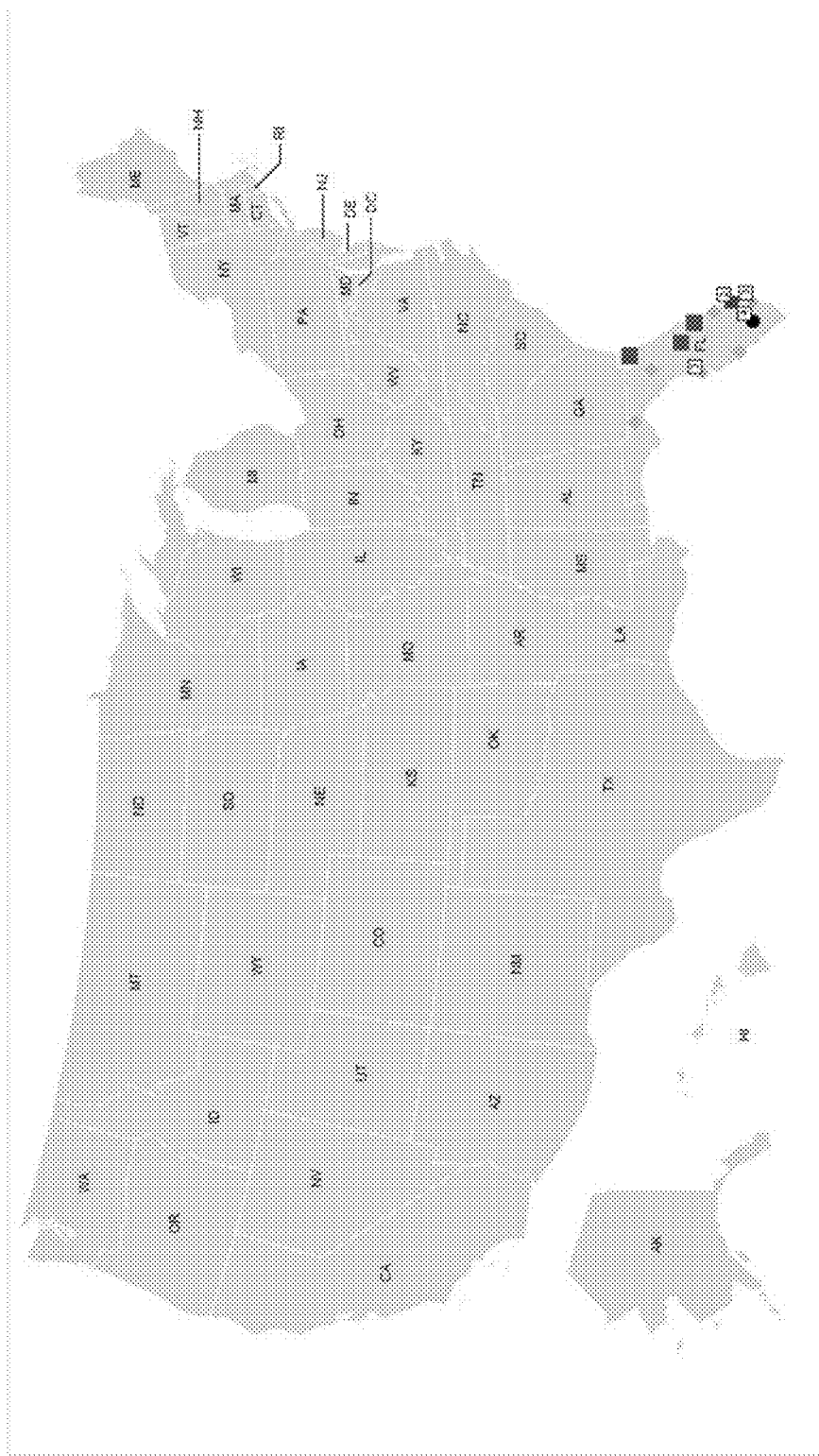
FIG. 9 illustrates a zoomed out view of the United States after the attribute based clustering has been performed in accordance with one embodiment.

FIG. 9 illustrates a zoomed out view of the United States after the attribute based clustering has been performed in accordance with one embodiment. As shown, in comparison to before the clustering, as shown in FIG. 2, the resulting groups help remove clutter while retaining the shape attribute dimension that would allow users to know at a glance the car dealership types in Florida at the zoom level of FIG. 9.

Figure 10:
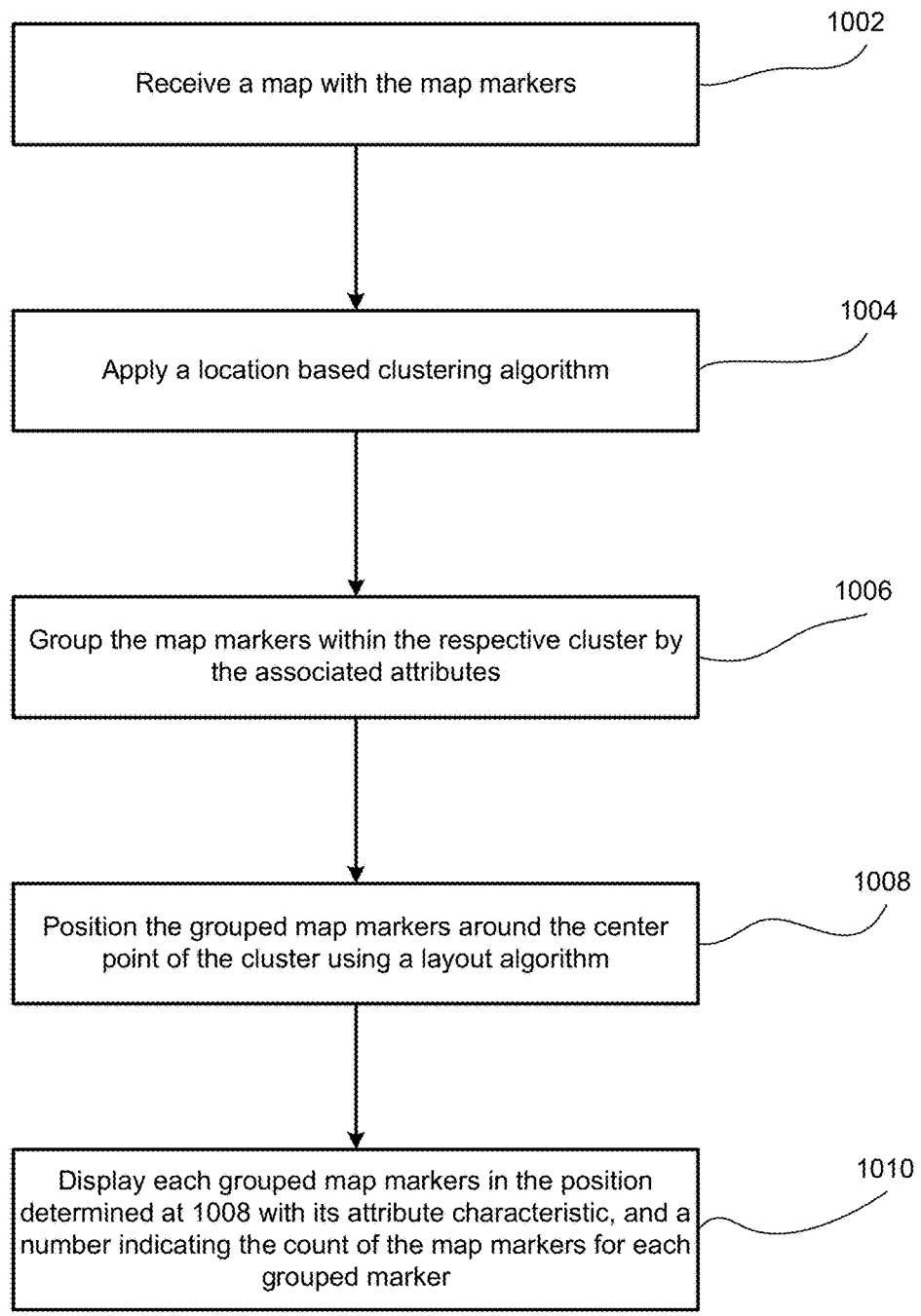
FIG. 10 is a flow diagram of the map marker clustering module of FIG. 1 when performing attribute based map marker clustering in accordance with embodiments of the present invention.

FIG. 10 is a flow diagram of map marker clustering module 16 of FIG. 1 when performing attribute based map marker clustering in accordance with embodiments of the present invention. In one embodiment, the functionality of the flow diagram of FIG. 10 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 1002, module 16 receives a map with the map markers. Each map marker has an associated location on the map, and an associated attribute that is reflected by a characteristic (e.g., shape, color, size, etc.) of the map marker.

At 1004, a location based clustering algorithm is applied, such as a grid or a distance based clustering algorithm. As a result, the map markers are clustered by location.

At 1006, the map markers within the respective cluster are further grouped by the associated attributes. Although a single attribute based clustering is described above (i.e., attributes corresponding to the shape characteristic), clustering by attribute can be based on multiple characteristics/attributes such as by shape and color. For multiple attributes, the clusters in one embodiment are generated for each unique tuple of the attributes. The order of the location clustering and attribute clustering can be reversed (i.e., first attribute clustering and then location clustering).

At 1008, the grouped map markers are positioned around the center point of the cluster using a layout algorithm such as force directed or circular.

At 1010, the grouped map markers are displayed in the position determined at 1008. Each grouped map marker will be displayed with its attribute characteristic, and a number indicating the count of the map markers for each grouped marker is also displayed.

As disclosed, embodiments use a two-step map marker clustering method that allows maps to de-clutter regions of dense marker data while retaining important map marker characteristics. This gives the end user more data and allows them to more quickly interact with the cluster of interest.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to cluster map markers on a map, the clustering comprising:
    receiving a plurality of map markers, each map marker having an associated location on the map and at least one associated attribute in addition to the associated location, and a visual characteristic corresponding to the associated attribute, the visual characteristic comprising a shape of the map marker;
    receiving an instruction to zoom out the map;
    location clustering the map markers based on an associated location of each of the map markers on the map within a location cluster, wherein the map markers are not clustered before the zoom out;
    after the location clustering, grouping the clustered map markers within the location cluster based on an associated attribute of each of the map markers, wherein the associated attribute is in addition to the associated location, the grouping comprising generating a plurality of grouped map markers for the location cluster that corresponds to each associated attribute and that replaces the clustered map markers, wherein each grouped map marker within the location cluster retains a corresponding visual characteristic of the associated attribute; and
    positioning the grouped map markers within the corresponding location cluster;
    wherein each of the groupings includes only map markers having a same attribute and for a first grouping of first map markers each having a first shape before grouping, a first grouped map marker has the same first shape after grouping, and for a second grouping of second map markers each having a second shape before grouping, a second grouped map marker has the same second shape after grouping, wherein the first shape is different than the second shape, and the first shape indicates a first attribute other than location of each of the map markers of the first grouping, and the second shape indicates a second attribute other than location of each of the map markers of the second grouping.

2. The computer-readable medium of claim 1, wherein the visual characteristic further comprises one of color, size or image.

3. The computer-readable medium of claim 1, wherein the location clustering comprises a grid based clustering.

4. The computer-readable medium of claim 1, wherein the location clustering comprises a distance based clustering.

5. The computer-readable medium of claim 1, wherein the positioning the grouped map markers within the corresponding cluster comprises positioning around a center point of the cluster.

6. The computer-readable medium of claim 5, wherein the positioning comprises a force directed layout.

7. The computer-readable medium of claim 5, wherein the positioning comprises a circular layout.

8. The computer-readable medium of claim 1, further comprising displaying an indicator of a number of map markers that form each grouped cluster.

9. A method for clustering map markers on a map, the method implemented by a processor coupled to a storage device that executes instructions, the method comprising:
    receiving a plurality of map markers, each map marker having an associated location on the map and at least one associated attribute in addition to the associated location, and a visual characteristic corresponding to the associated attribute, the visual characteristic comprising a shape of the map marker;
    receiving an instruction to zoom out the map;
    location clustering the map markers based on an associated location of each of the map markers on the map within a location cluster, wherein the map markers are not clustered before the zoom out;
    after the location clustering, grouping the clustered map markers within the location cluster based on an associated attribute of each of the map markers, wherein the associated attribute is in addition to the associated location, the grouping comprising generating a plurality of grouped map markers for the location cluster that corresponds to each associated attribute and that replaces the clustered map markers, wherein each grouped map marker within the location cluster retains a corresponding visual characteristic of the associated attribute; and
    positioning the grouped map markers within the corresponding cluster;
    wherein each of the groupings includes only map markers having a same attribute and for a first grouping of first map markers each having a first shape before grouping, a first grouped map marker has the same first shape after grouping, and for a second grouping of second map markers each having a second shape before a second grouped map marker has the same second shape after grouping, wherein the first shape is different than the second shape, and the first shape indicates a first attribute other than location of each of the map markers of the first grouping, and the second shape indicates a second attribute other than location of each of the map markers of the second grouping.

10. The method of claim 9, wherein the visual characteristic further comprises one of color, size or image.

11. The method of claim 9, wherein the grouping is based on multiple associated attributes.

12. The method of claim 11, wherein the grouping is based on a unique tuple of the attributes.

13. The method of claim 9, wherein the positioning the grouped map markers within the corresponding cluster comprises positioning around a center point of the cluster.

14. The method of claim 13, wherein the positioning comprises a force directed layout.

15. The method of claim 13, wherein the positioning comprises a circular layout.

16. The method of claim 9, further comprising displaying an indicator of a number of map markers that form each grouped cluster.

17. A map marker clustering system comprising:
a processor;
a storage device coupled to the processor and storing a map marker clustering module;
a display device coupled to the processor;
the map marker clustering module, when executed by the processor:
receiving a plurality of map markers, each map marker having an associated location on a map and at least one associated attribute in addition to the associated location, and a visual characteristic corresponding to the associated attribute, the visual characteristic comprising a shape of the map marker;
receiving an instruction to zoom out the map;
location clustering the map markers based on an associated location of each of the map markers on the map within a location cluster, wherein the map markers are not clustered before the zoom out;
after the location clustering, grouping the clustered map markers within the location cluster based on an associated attribute of each of the map markers, wherein the associated attribute is in addition to the associated location, the grouping comprising generating a plurality of grouped map markers for the location cluster that corresponds to each associated attribute and that replaces the clustered map markers, wherein each grouped map marker within the location cluster retains a corresponding visual characteristic of the associated attribute;
positioning the grouped map markers within the corresponding cluster; and
displaying on the display device the clustered map markers on the map;
wherein each of the groupings includes only map markers having a same attribute and for a first grouping of first map markers each having a first shape before grouping, a first grouped map marker has the same first shape after grouping, and for a second grouping of second map markers each having a second shape before grouping, a second grouped map marker has the same second shape after grouping, wherein the first shape is different than the second shape, and the first shape indicates a first attribute other than location of each of the map markers of the first grouping, and the second shape indicates a second attribute other than location of each of the map markers of the second grouping.

18. The system of claim 17, further comprising displaying on the display device an indicator of a number of map markers that form each grouped cluster.

19. The system of claim 17, wherein the processor is remotely coupled to the display device.

20. The system of claim 17, wherein the positioning the grouped map markers within the corresponding cluster comprises positioning around a center point of the cluster.

* * * * *